(12) United States Patent
Lee et al.

(10) Patent No.: US 10,259,424 B2
(45) Date of Patent: Apr. 16, 2019

(54) PAWL MEMBER HOLDING UNIT OF RETRACTOR FOR SEAT BELT AND RETRACTOR FOR SEAT BELT HAVING THE SAME

(71) Applicant: WOOSHIN SAFETY SYSTEMS CO., LTD., Hwaseong-si (KR)

(72) Inventors: Kyung Sang Lee, Anyang-si (KR); Taeck Rim Song, Gunpo-si (KR); Doo Yong Kim, Ansan-si (KR); Jung Hun Choi, Hwaseong-si (KR); Kwang Min Kim, Busan (KR); Jae Hyuk Park, Yesan-gun (KR)

(73) Assignee: WOOSHIN SAFETY SYSTEMS CO., LTD., Hwaseong-si (KR)

( * ) Notice: Subject to any disclaimer, the term of this patent is extended or adjusted under 35 U.S.C. 154(b) by 191 days.

(21) Appl. No.: 15/392,422

(22) Filed: Dec. 28, 2016

(65) Prior Publication Data

US 2017/0197580 A1 Jul. 13, 2017

(30) Foreign Application Priority Data

Jan. 12, 2016 (KR) .......................... 10-2016-0003708

(51) Int. Cl.
*B60R 22/35* (2006.01)
*B60R 22/46* (2006.01)

(52) U.S. Cl.
CPC .............. *B60R 22/35* (2013.01); *B60R 22/46* (2013.01); *B60R 2022/468* (2013.01)

(58) Field of Classification Search
CPC .... B60R 22/35; B60R 22/46; B60R 2022/468
See application file for complete search history.

(56) References Cited

U.S. PATENT DOCUMENTS

| 4,597,543 | A | 7/1986 | Mori et al. | |
|---|---|---|---|---|
| 6,641,077 | B2 * | 11/2003 | Hanna | B60R 22/415 242/382.2 |
| 7,290,730 | B2 * | 11/2007 | Nagata | B60R 22/4633 242/374 |
| 2015/0217722 | A1 * | 8/2015 | Osada | B60R 22/40 242/384.1 |

FOREIGN PATENT DOCUMENTS

| CN | 1853991 | 11/2006 |
|---|---|---|
| CN | 101472773 | 7/2009 |
| EP | 0298123 | 1/1989 |
| KR | 101550663 | 9/2015 |

\* cited by examiner

*Primary Examiner* — Sang K Kim
(74) *Attorney, Agent, or Firm* — Cantor Colburn LLP

(57) ABSTRACT

A pawl member holding unit of a retractor for a seat belt includes: a cam protrusion which is provided at the other side of a torsion bar that is provided inside a spool, shares a rotation axis with the spool, and rotates together with the spool, the cam protrusion moving in accordance with the rotation of the torsion bar by an operation of a pretensioner; and a rotating member which rotates about a rotating shaft in accordance with the movement of the cam protrusion, and applies external force in a direction opposite to a direction in which a pawl member, which performs an automatic locking function, protrudes.

9 Claims, 16 Drawing Sheets

PAWL MEMBER HOLDING UNIT OF RETRACTOR FOR SEAT BELT AND RETRACTOR FOR SEAT BELT HAVING THE SAME

CROSS-REFERENCE TO RELATED APPLICATIONS

This application claims priority to and the benefit of Korean Patent Application No. 10-2016-0003708 filed in the Korean Intellectual Property Office on Jan. 12, 2016, the entire contents of which are incorporated herein by reference.

TECHNICAL FIELD

The present invention relates to a pawl member holding unit of a retractor for a seat belt and a retractor for a seat belt including the same, and more particularly, to a retractor for a seat belt which is capable of preventing a locking deep phenomenon and an overshoot phenomenon by restricting a pawl member by using a cam protrusion which is moved by a rotation of a torsion bar, and a rotating member which is rotated by the cam protrusion.

BACKGROUND ART

Various types of safety devices are provided to prevent an occupant seated in a vehicle or a machine from being catapulted out of the vehicle or the machine due to a collision between vehicles or a collision with other objects.

A seat belt is the representative safety device among the safety devices, and a lower abdomen and a chest of the occupant seated in the vehicle or the machine may be stably secured to the seat by using the seat belt. However, a large amount of load may be applied to the occupant in some instances because collision severity varies based on the types of collisions between the vehicles or with other objects, and safety of the occupant seated in the vehicle or the machine is jeopardized in this case.

Therefore, various technologies are being developed so as to allow the seat belt to exhibit its own function even in a case in which a magnitude of a collision between vehicles or a collision with other objects is large. Among the various technologies, a retractor is in the limelight recently.

The retractor may have a pretensioner which increases a function and an effect of the seat belt by retracting a webbing of the seat belt at the time of a collision between vehicles or a collision with other objects, and an emergency locking retractor (ELR) operating unit which fixes one side of a spool in order to prevent the webbing from being retracted any more after the pretensioner operates.

As illustrated in FIG. 1, a load being applied to a driver's body is continuously increased after a gas generator at a side of the pretensioner operates, and the load is gradually decreased as external force by the gas generator is decreased.

In the case of the retractor in the related art, there occur a locking deep phenomenon in which the applied load is rapidly decreased during the aforementioned process, and an overshoot phenomenon in which the applied load is increased.

Specifically, the locking deep phenomenon refers to a phenomenon in which the applied load is rapidly decreased as a delay occurs during a process in which the ELR operating unit operates after the pretensioner operates, and the overshoot phenomenon refers to a phenomenon in which gas residual pressure of the gas generator hinders the operations of the ELR operating unit and a load limiter, and restricting performance deteriorates due to the phenomena, which causes the driver to be injured in many instances.

Accordingly, there is a need for a method for solving the aforementioned problems.

SUMMARY OF THE INVENTION

The present invention has been made in an effort to provide a retractor for a seat belt which prevents a locking deep phenomenon and an overshoot phenomenon.

The present invention has also been made in an effort to provide a retractor for a seat belt which is capable of minimizing injuries to a driver's body.

Technical problems of the present invention are not limited to the aforementioned technical problems, and other technical problems, which are not mentioned above, may be clearly understood by those skilled in the art from the following descriptions.

An exemplary embodiment of the present invention provides a pawl member holding unit of a retractor for a seat belt, the pawl member holding unit including: a cam protrusion which is provided at the other side of a torsion bar that is provided inside a spool, shares a rotation axis with the spool, and rotates together with the spool, the cam protrusion moving in accordance with the rotation of the torsion bar by an operation of a pretensioner; and a rotating member which rotates about a rotating shaft in accordance with the movement of the cam protrusion, and applies external force in a direction opposite to a direction in which a pawl member, which performs an automatic locking function, protrudes.

The rotating member may rotate in a direction in which the rotating member draws the pawl member downward in order to forcibly restore the protruding pawl member.

The cam protrusion may be provided at a position eccentric from the rotation axis of the torsion bar.

A distance between the rotation axis of the torsion bar and the rotating shaft of the rotating member may be shorter than a distance between the rotation axis of the torsion bar and the cam protrusion.

A distance between the rotation axis of the torsion bar and the rotating shaft of the rotating member may be longer than a distance between the rotation axis of the torsion bar and the cam protrusion.

The pawl member holding unit may further include a restoring member which has elasticity to restore the pawl member in a direction opposite to the direction in which the pawl member protrudes.

The restoring member may be connected to the rotating member, and may provide restoring force in a direction in which the rotating member rotates to restrict the pawl member.

Another exemplary embodiment of the present invention provides a retractor for a seat belt, the retractor including: a frame which has an inner gear formed therein; a spool which is rotatably provided in the frame so as to wind or unwind a webbing; a torsion bar which is provided inside the spool, shares a rotation axis with the spool, and rotates together with the spool; a pretensioner which is provided at one side of the spool, rotates the torsion bar and the spool in a direction in which the webbing is retracted when impact occurs from the outside, and fixes one side of the torsion bar; and an overshoot mitigating module which is provided at the other side of the spool, rotates along with the rotation of the spool after the pretensioner fixes one side of the torsion bar, and rotates the other side of the torsion bar, in which the overshoot mitigating module includes: a locking assembly which includes a pawl member that is formed to selectively protrude outward, has gear teeth meshing with gear teeth of the inner gear, and has a catching protrusion; and a holding unit which includes a rotating member that is formed to be rotatable by a rotating shaft, and a cam protrusion that is provided at the other side of the torsion bar and allows the rotating member to be caught by the catching protrusion by rotating the rotating member along with the rotation of the torsion bar by the operation of the pretensioner.

The pawl member holding unit of the retractor for a seat belt and the retractor for a seat belt including the same according to the present invention have the following effects.

First, there is an advantage in that it is possible to preventing an operation of an automatic locking function by restricting the pawl member of the locking assembly by the holding unit.

Second, there is an advantage in that it is possible to forcibly restore the pawl member by the rotation of the rotating member even in a case in which the pawl member has moved and protruded.

Third, there is an advantage in that it is possible to minimize a locking deep phenomenon and an overshoot phenomenon since one side of the torsion bar is fixed by the pretensioner and the other side of the torsion bar is rotated by the overshoot mitigating module.

Fourth, there is an advantage in that it is possible to minimize an influence by gas residual pressure of the gas generator.

Fifth, there is an advantage in that it is possible to minimize injuries to a driver's body.

Fourth, there is an advantage in that the structure is simple, reliability of the operation is increased, and manufacture is easily carried out.

The effects of the present invention are not limited to the aforementioned effects, and other effects, which are not mentioned above, will be clearly understood by those skilled in the art from the claims.

DETAILED DESCRIPTION

Figure 1:
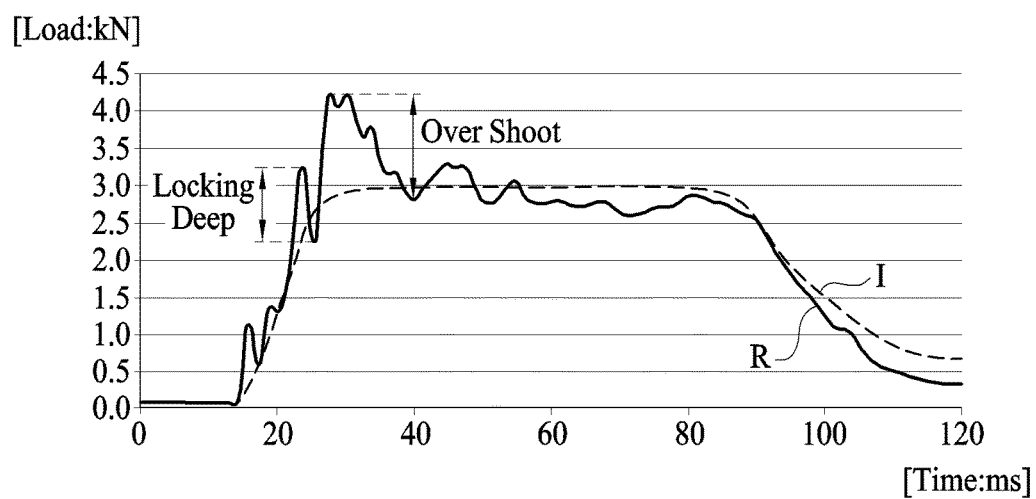
FIG. 1 is a graph illustrating a change in load being applied to a driver's body during a process in which a pretensioner in the related art operates.

Hereinafter, an exemplary embodiment of the present invention for specifically accomplishing the objects of the present invention will be described with reference to the accompanying drawings. In the description of the present exemplary embodiment, like terms and like reference numerals are used for like components, and additional descriptions will be omitted.

A pawl member holding unit of a retractor for a seat belt according to the present invention is provided at one side of the retractor and prevents an operation of a locking assembly that performs an emergency locking retractor (ELR) function or the like when the pretensioner operates.

More specifically, the locking assembly includes a pawl member which selectively meshes with an inner gear provided on a frame of the retractor, and the pawl member holding unit according to the present invention restricts the pawl member in a situation in which the pretensioner operates or in situation in which the ELR function needs to be prevented, thereby greatly improving safety.

In particular, the pawl member holding unit according to the present invention includes a rotating member that applies external force in a direction opposite to a direction in which the pawl member protrudes, and therefore, it is possible to forcibly draw the pawl member downward to restore the pawl member in accordance with the rotation of the rotating member even in a state in which the pawl member has already moved and protruded. This configuration is to minimize a locking deep phenomenon and an overshoot phenomenon caused by the ELR function.

Hereinafter, an operational mechanism of the pawl member holding unit and an overall operating process of the retractor according to the present invention will be described based on a situation in which the pretensioner operates.

Figure 2:
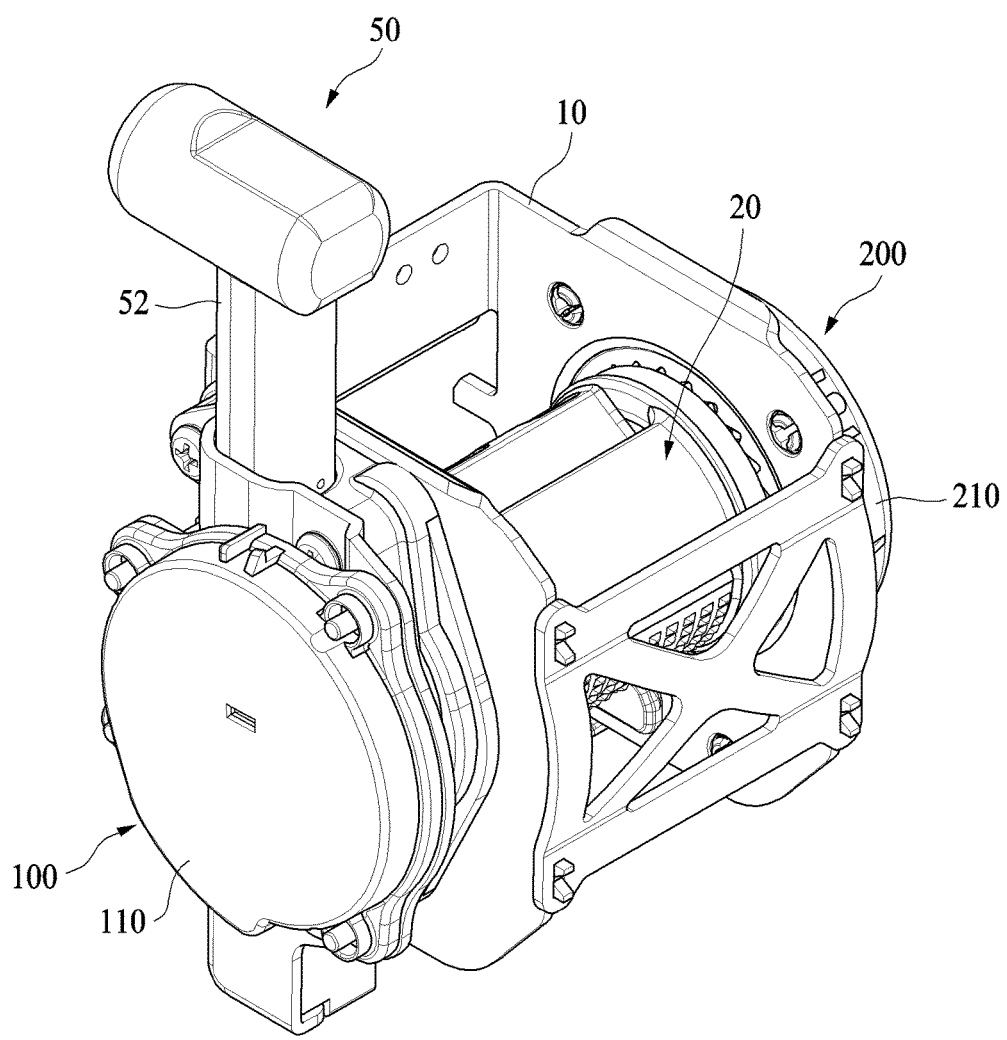
FIG. 2 is a perspective view illustrating an external appearance of a retractor for a seat belt according to a first exemplary embodiment of the present invention.
Figure 3:
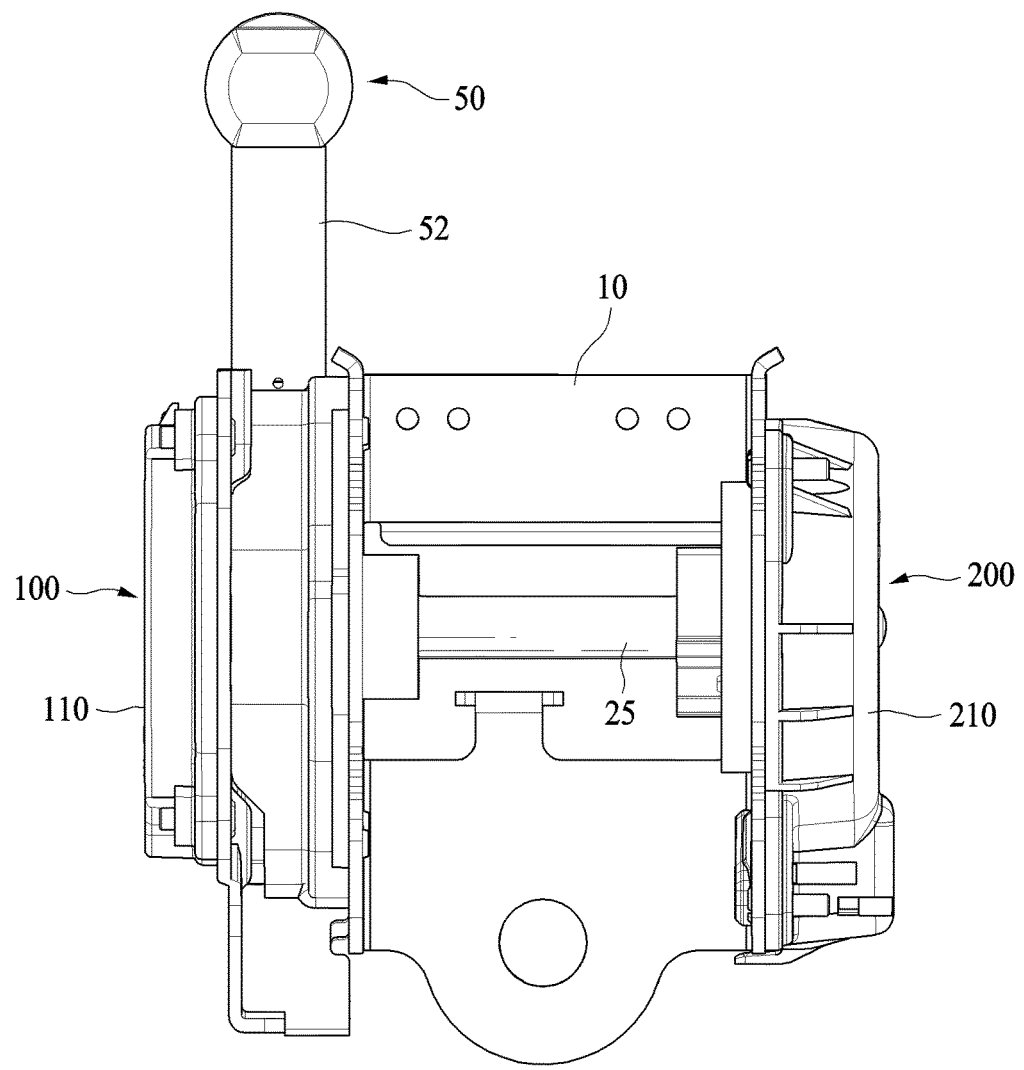
FIG. 3 is a front view illustrating an external appearance of the retractor for a seat belt according to the first exemplary embodiment of the present invention.

FIG. 2 is a perspective view illustrating an external appearance of a retractor for a seat belt according to a first exemplary embodiment of the present invention, and FIG. 3 is a front view illustrating an external appearance of the retractor for a seat belt according to the first exemplary embodiment of the present invention.

As illustrated in FIGS. 2 and 3, the retractor for a seat belt according to the first exemplary embodiment of the present invention includes a frame 10, a spool 20, a torsion bar 25, a pretensioner 100, and an overshoot mitigating module 200.

The frame 10 provides a base on which the constituent elements may be provided, and the spool 20 is rotatably provided in the frame 10 so as to wind or unwind a webbing (not illustrated). Further, a torsion bar 25, which defines a rotation axis, is provided inside the spool 20. In this case, the torsion bar 25 shares the rotation axis with the spool 20, and rotates together with the spool 20.

In the present exemplary embodiment, the pretensioner 100 and the overshoot mitigating module 200 are provided at both sides based on the spool 20, respectively, and the pretensioner 100 and the overshoot mitigating module 200 include cover housings 110 and 210, respectively, which each have an accommodating space formed therein.

The pretensioner 100 is a constituent element which is provided at one side of the spool 20, and rotates the torsion bar 25 and the spool 20 in a direction in which the webbing is retracted when impact occurs from the outside. That is, the pretensioner 100 serves to stably hold a driver's body by retracting the webbing when impact occurs in the vehicle, so that the driver is not be catapulted out of a driver seat.

The pretensioner 100 fixes one side of the torsion bar 25 after rotating the torsion bar 25 and the spool 20, and this operation will be described below.

The overshoot mitigating module 200 is provided at the other side of the spool 20, and rotates along with the rotation of the spool 20. Further, after the pretensioner 100 fixes one side of the torsion bar 25, the overshoot mitigating module 200 rotates along with the rotation of the spool 20 and serves to rotate the other side of the torsion bar 25.

That is, after one side of the torsion bar 25 is fixed, the overshoot mitigating module 200 rotates the other side of the torsion bar 25, which is opposite to the one side of the torsion bar 25, thereby preventing the overshoot phenomenon, and this operation will also be described below.

Hereinafter, the pretensioner 100 and the overshoot mitigating module 200 will be described in more detail.

Figure 4:
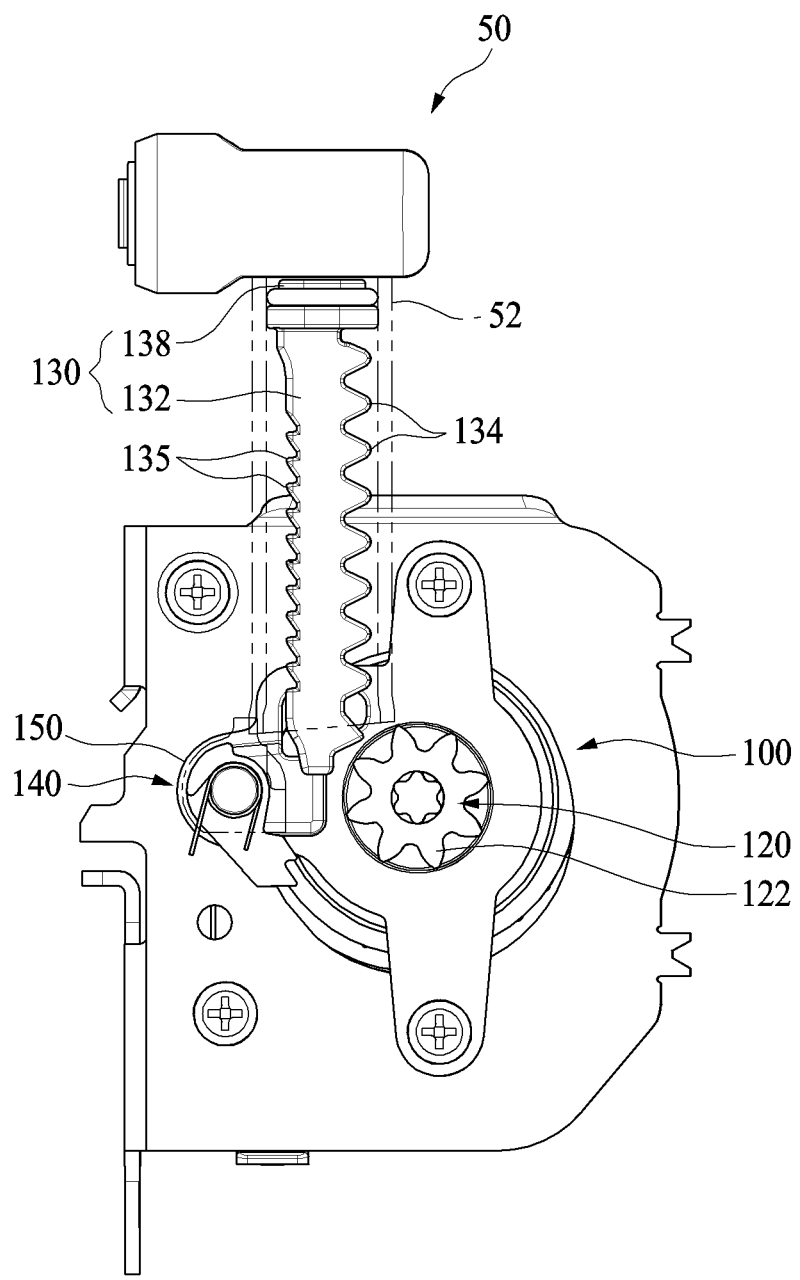
FIG. 4 is a side view illustrating an internal structure of a pretensioner in the retractor for a seat belt according to the first exemplary embodiment of the present invention.
Figure 5:
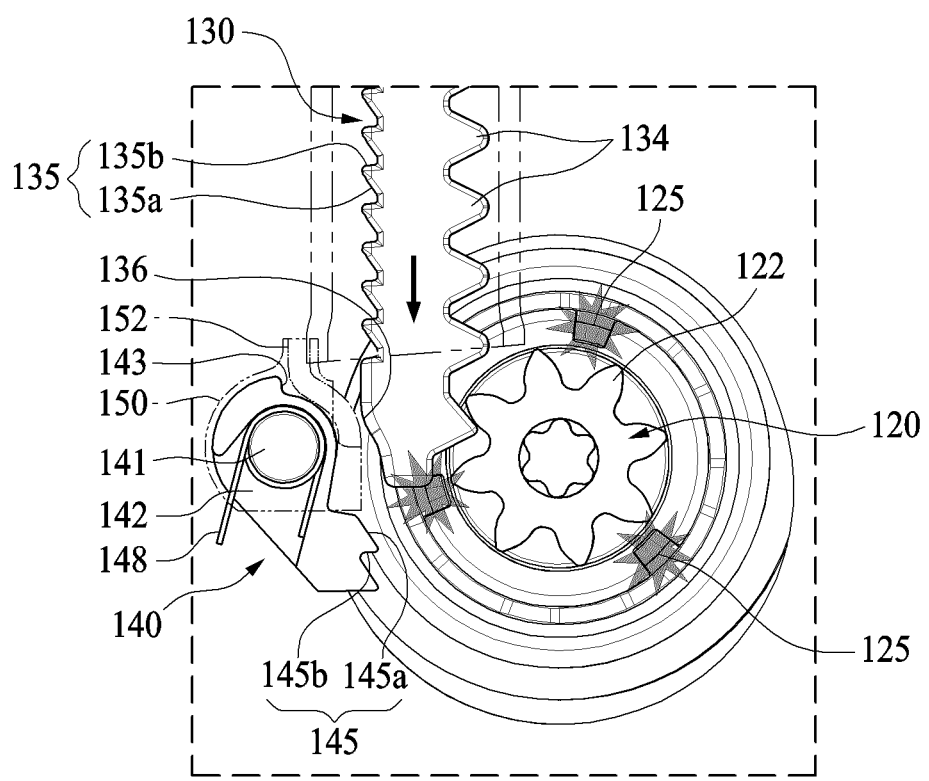
FIG. 5 is a side view illustrating a state in which a fracture portion is fractured by a movement of a ratchet gear in the retractor for a seat belt according to the first exemplary embodiment of the present invention.

FIG. 4 is a side view illustrating an internal structure of the pretensioner 100 in the retractor for a seat belt according to the first exemplary embodiment of the present invention, and FIG. 5 is a side view illustrating a state in which a fracture portion 125 is fractured by a movement of a ratchet gear 130 in the retractor for a seat belt according to the first exemplary embodiment of the present invention.

Figure 6:
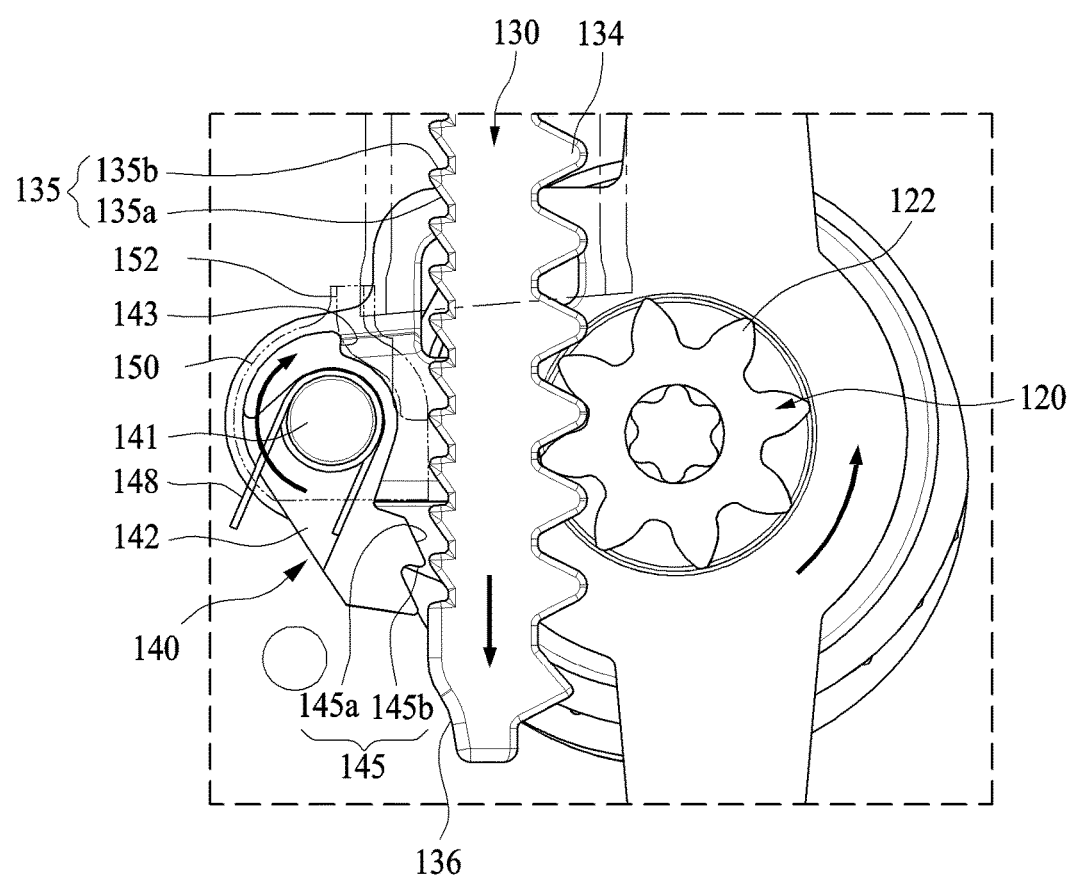
FIG. 6 is a side view illustrating a state in which a pinion gear is rotated by the movement of the ratchet gear in the retractor for a seat belt according to the first exemplary embodiment of the present invention.
Figure 7:
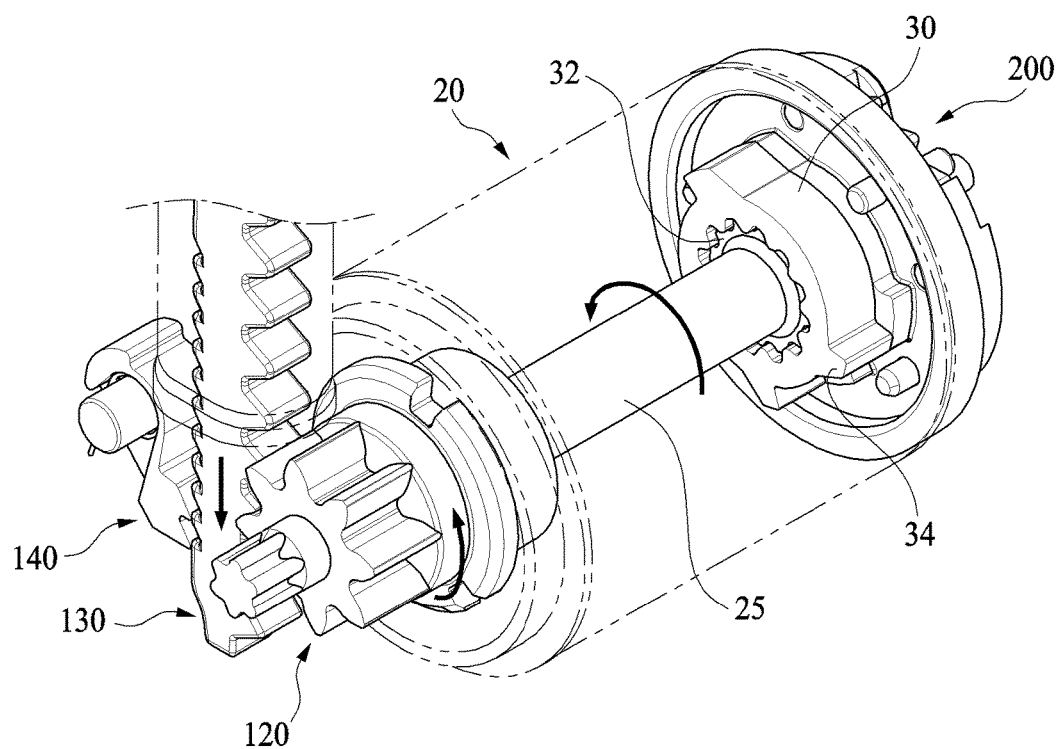
FIG. 7 is a side view illustrating a state in which a torsion bar is rotated by the rotation of the pinion gear in the retractor for a seat belt according to the first exemplary embodiment of the present invention.

FIG. 6 is a side view illustrating a state in which a pinion gear 120 is rotated by the movement of the ratchet gear 130 in the retractor for a seat belt according to the first exemplary embodiment of the present invention, and FIG. 7 is a side view illustrating a state in which the torsion bar 25 is rotated by the rotation of the pinion gear 120 in the retractor for a seat belt according to the first exemplary embodiment of the present invention.

As illustrated in FIGS. 4 to 7, in the present exemplary embodiment, the pretensioner 100 includes the pinion gear 120, a gas generator 50, the ratchet gear 130, and a fixing unit 140.

The pinion gear 120 is a constituent element which is connected to the torsion bar and rotates together with the torsion bar. In the present exemplary embodiment, a plurality of gear teeth 122 is formed around a circumference of the pinion gear 120.

The gas generator 50 generates explosive power in response to impact from the outside, and the ratchet gear 130 is a constituent element which meshes with the pinion gear 120 by the explosive power of the gas generator 50 and rotates the pinion gear 120 in the direction in which the webbing is retracted.

In the present exemplary embodiment, the ratchet gear 130 includes a gear body 132 which is elongated in a longitudinal direction thereof, first gear teeth 134 which are formed at one side of the gear body 132 in the longitudinal direction of the gear body 132 and correspond to the gear teeth 122 of the pinion gear 120, second gear teeth 135 which are formed at the other side of the gear body 132 in the longitudinal direction of the gear body 132, and a sealing portion 138.

In this case, the ratchet gear 130 is provided in a state in which the gear body 132 is inserted into a connecting tube 52 connected to the gas generator 50, and the gear body 132 is moved along the connecting tube 52 when the explosive power is transmitted from the gas generator 50.

Therefore, the first gear teeth 134 mesh with the gear teeth 122 of the pinion gear 120, and as illustrated in FIG. 5, a fracture portion 125 is fractured by force that occurs when the ratchet gear 130 moves. The fracture portion 125 is a constituent element which fixes the torsion bar and the spool, and as the fracture portion 125 is fractured, one side of the torsion bar and one side of the spool are separated from each other.

Thereafter, as illustrated in FIG. 6, the pinion gear 120 is rotated as the ratchet gear 130 moves downward, and as illustrated in FIG. 7, the torsion bar 25 and the spool 20 are rotated in the direction in which the webbing is retracted. In this case, an inclined surface 136 is formed at a lower portion of the ratchet gear 130, such that the ratchet gear 130 may smoothly move.

With the aforementioned process, it is possible to hold the driver's body by retracting the webbing so that the driver's body is not catapulted when impact occurs in the vehicle.

Meanwhile, the pretensioner 100 according to the present exemplary embodiment includes the fixing unit 140, the fixing unit 140 prevents the ratchet gear 130 from being restored as the explosive power transmitted from the gas generator 50 is reduced. That is, the fixing unit 140 prevents the restoration of the ratchet gear 130, thereby preventing one side of the torsion bar 25 from rotating.

In the present exemplary embodiment, the fixing unit 140 includes a fixing member 142, a restoring member 148, and a cover 150.

The fixing member 142 is provided at a position spaced apart from the pinion gear 120 so as to be rotatable by a rotating shaft 141, and has fixing gear teeth 145 that correspond to the second gear teeth 135 of the ratchet gear 130. That is, the ratchet gear 130 has a width that corresponds to a separation distance between the fixing member 140 and the pinion gear 120, the ratchet gear 130 is inserted between the fixing member 140 and the pinion gear 120 by the explosive power of the gas generator 50, the first gear teeth 134 come into contact with the gear teeth 122 of the pinion gear 120, and the second gear teeth 135 come into contact with the fixing gear teeth 145 of the fixing member 142.

However, in the present exemplary embodiment, in a state in which the ratchet gear 130 is moved by the explosive power of the gas generator 50, a leading surface 135a of each of the second gear teeth 135 and an opposing surface 145a of each of the fixing gear teeth 145 are formed to be inclined so as to correspond to each other. Therefore, when the ratchet gear 130 moves downward, the fixing member 142 is pushed by being rotated and does not hinder the movement of the ratchet gear 130.

On the contrary, in a situation in which the ratchet gear 130 is subsequently restored as the webbing begins to be retracted again as the explosive power transmitted from the gas generator 50 is reduced, the fixing gear teeth 145 mesh with the second gear teeth 135, thereby preventing the restoration of the ratchet gear 130.

That is, a restoring direction surface 135b of each of the second gear teeth 135 and an opposing surface 145b of each of the fixing gear teeth 145 are not inclined and come into contact with each other in a perpendicular manner, and as a result, when the ratchet gear 130 is moved upward, the restoring direction surface 135b of each of the second gear teeth 135 and the opposing surface 145b of each of the fixing gear teeth 145 mesh with each other, such that the ratchet gear 130 may not be moved. Therefore, the pinion gear 120 is also not rotated and is maintained in a fixed state, and one side of the torsion bar 25 is fixed.

In the present exemplary embodiment, the fixing unit 140 may further include the restoring member 148 which restores the fixing member 142 which has been pushed and rotated by the downward movement of the ratchet gear 130, and a stopper 152 which limits a range in which the fixing member 142 is pushed by the ratchet gear 130.

In the present exemplary embodiment, the stopper 152 is formed on the cover 150 which surrounds the fixing member 142 and provides the rotating shaft 141, and a fixing protrusion 143, which is caught by the stopper 152, is further formed on the fixing member 142.

That is, the fixing protrusion 143 comes into contact with the stopper 152 and may limit a maximum range in which the fixing member 142 is pushed by the ratchet gear 130, thereby preventing the fixing member 142 from being excessively rotated.

Figure 8:
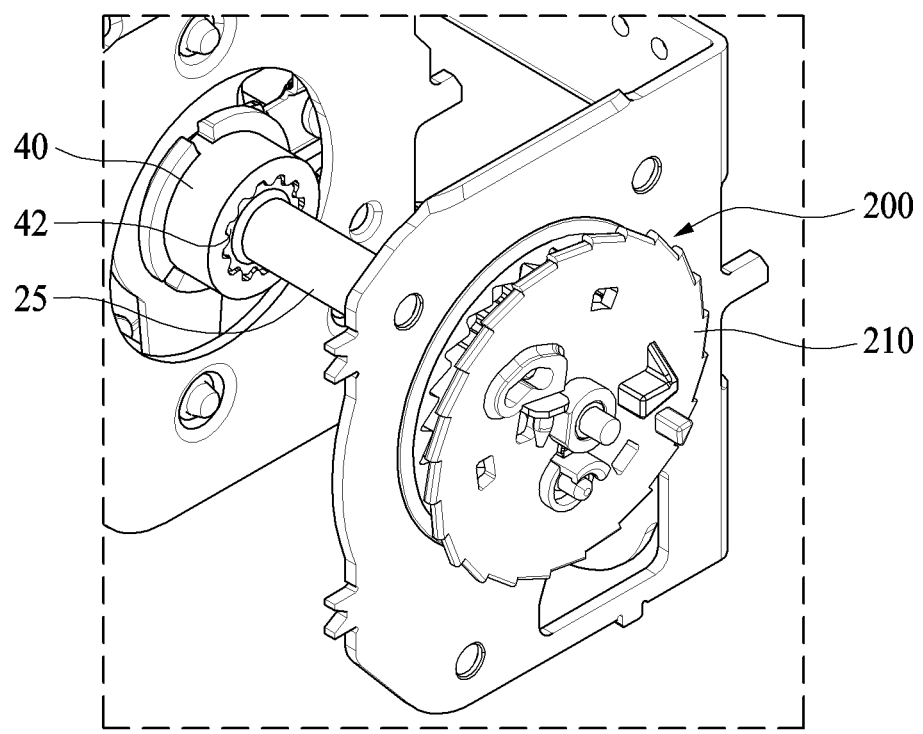
FIG. 8 is a perspective view illustrating an internal structure of an overshoot mitigating module in the retractor for a seat belt according to the first exemplary embodiment of the present invention.

Meanwhile, as illustrated in FIGS. 7 and 8, in the present exemplary embodiment, a second connecting portion 32, which corresponds to a serrated groove of a first connecting portion 30, is formed at the other end of the torsion bar 25, and a fourth connecting portion 42, which corresponds to a serrated groove of a third connecting portion 40, is formed at one end of the torsion bar 25. Therefore, rotational force of the torsion bar 25, which is caused by the downward movement of the ratchet gear 130, is transmitted to the overshoot mitigating module 200.

Figure 9:
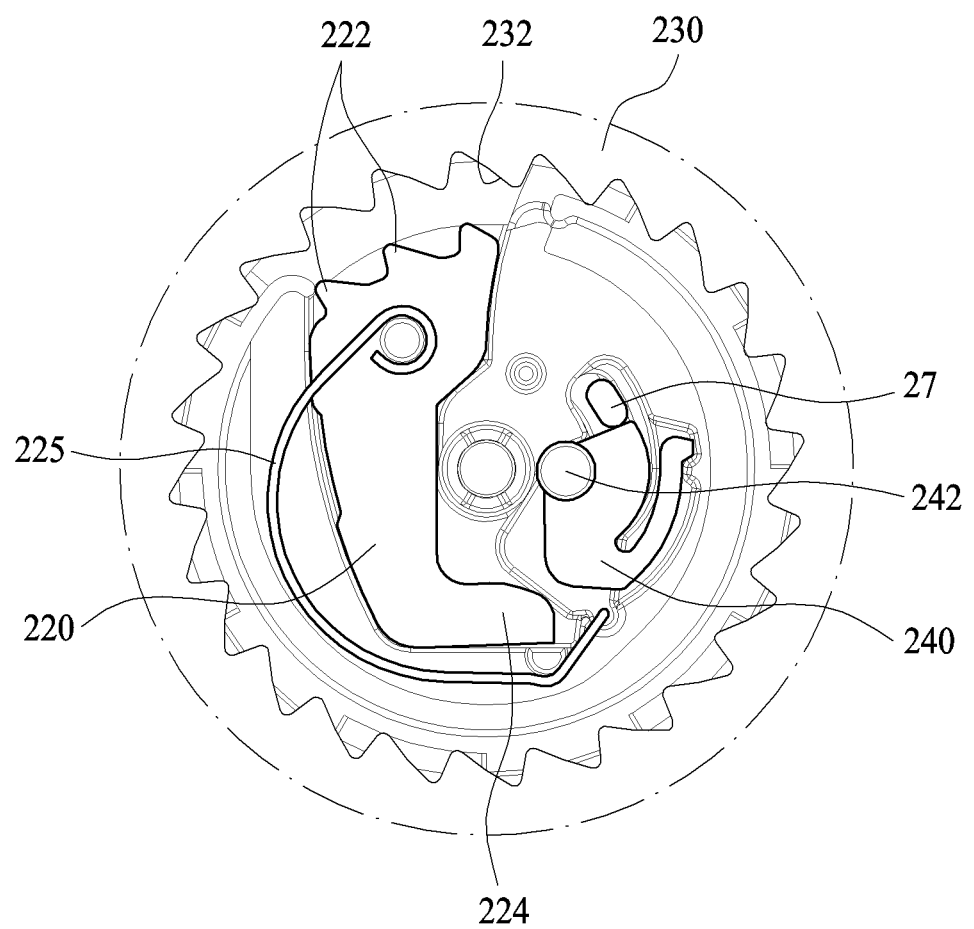
FIG. 9 is a side view illustrating an appearance of a holding unit applied to the retractor for a seat belt according to the first exemplary embodiment of the present invention.

Referring to FIGS. 8 and 9, in the present exemplary embodiment, the overshoot mitigating module 200 includes: a locking assembly 210 having a mechanism in which gear teeth 222 of a pawl member 220 mesh with gear teeth 232 of an inner gear 230 formed in the frame, thereby preventing the rotation of the spool; and a holding unit for preventing an operation of the locking assembly 210.

The locking assembly 210 is a constituent element for preventing the spool from being rotated in various situations, and because the locking assembly 210 is obvious to those skilled in the art, a detailed description thereof will be omitted.

In this case, in the retractor in the related art, there is used a method of preventing the rotation of one side of the torsion bar 25 by operating the locking assembly 210 even in a case in which the webbing is retracted again as the force transmitted by the explosive power of the gas generator is reduced after the pretensioner operates. However, there is a problem in that a locking deep phenomenon occurs as a delay occurs during a process in which the locking assembly 210 operates as described above.

In contrast, in the present invention, since a method of restricting the rotation of one side of the torsion bar 25 at a side of the pretensioner is used, a delay does not occur unlike the retractor in the related art, thereby preventing the locking deep phenomenon.

Because an overshoot phenomenon, in which a load being applied to the driver's body is rapidly increased, may occur at the moment when one side of the torsion bar 25 is fixed, it is necessary to allow the overshoot mitigating module 200 to slightly rotate after the pretensioner operates.

In particular, in a case in which the overshoot mitigating module 200 includes the locking assembly 210 as described in the present exemplary embodiment, it is possible to prevent an increase in the applied load by preventing the pawl member 220 from meshing with the inner gear 230. Therefore, the present invention may further include the holding unit for preventing the pawl member 220 from protruding outward, and the holding unit will be described below in detail.

In the present exemplary embodiment, the holding unit includes a rotating member 240 and a cam protrusion 27.

The rotating member 240 is formed to be rotatable by a rotating shaft 242, and restricts the pawl member 220 by applying external force in a direction opposite to a direction in which the pawl member 220 protrudes. In the present exemplary embodiment, a catching protrusion 224 is formed on the pawl member 220, and the rotating member 240 comes into contact with the catching protrusion 224 to restrict the pawl member 220.

The cam protrusion 27 is provided at the other side of the torsion bar 25, and rotates the rotating member 240 in accordance with the rotation of the torsion bar 25 by the operation of the pretensioner.

In particular, in the present exemplary embodiment, the rotating member 240 is provided to be rotatable in a direction in which the protruding pawl member 220 may be forcibly restored. That is, even in a case in which the pawl member 220 has already protruded and meshed with the inner gear 232, the rotating member 240 may forcibly draw the pawl member 220 downward, thereby restoring the pawl member 220 to the original position.

Figure 10:
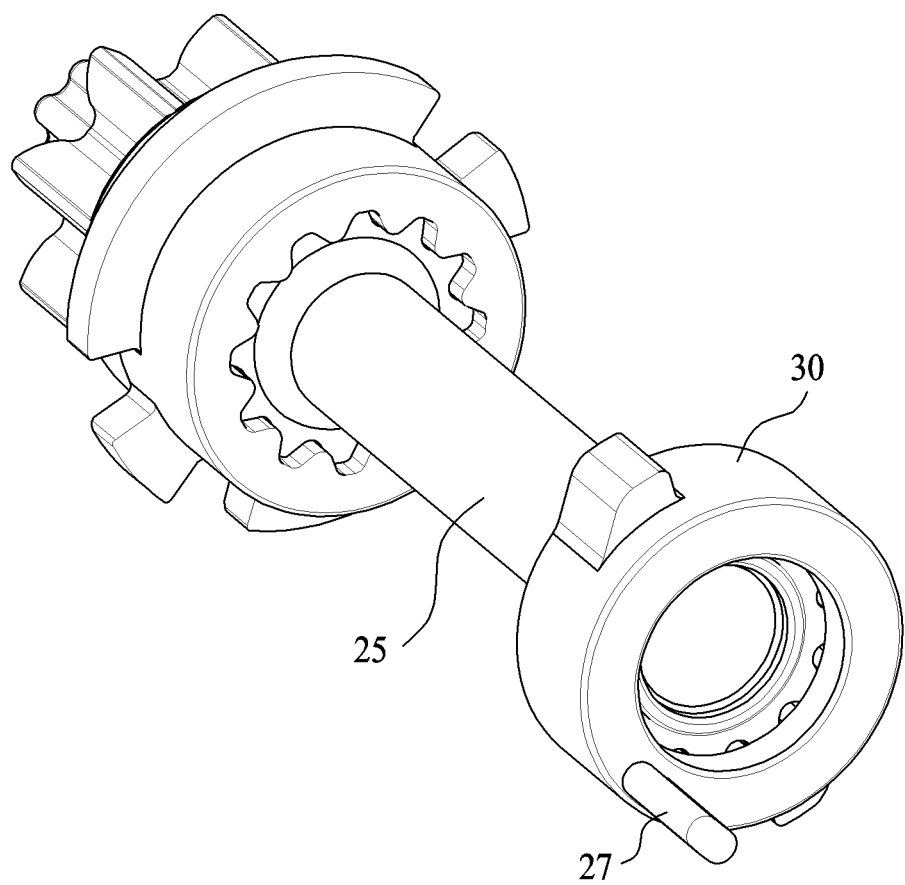
FIG. 10 is a perspective view illustrating a connection structure between a cam protrusion and the torsion bar of the holding unit applied to the retractor for a seat belt according to the first exemplary embodiment of the present invention.

In the present exemplary embodiment, as illustrated in FIG. 10, the cam protrusion 27 is provided at one side of the first connecting portion 30. That is, the cam protrusion 27 is provided at a position eccentric from the rotation axis of the torsion bar 25, and the cam protrusion 27 may rotate while following a circular trajectory along with the rotation of the torsion bar 25.

Figure 11:
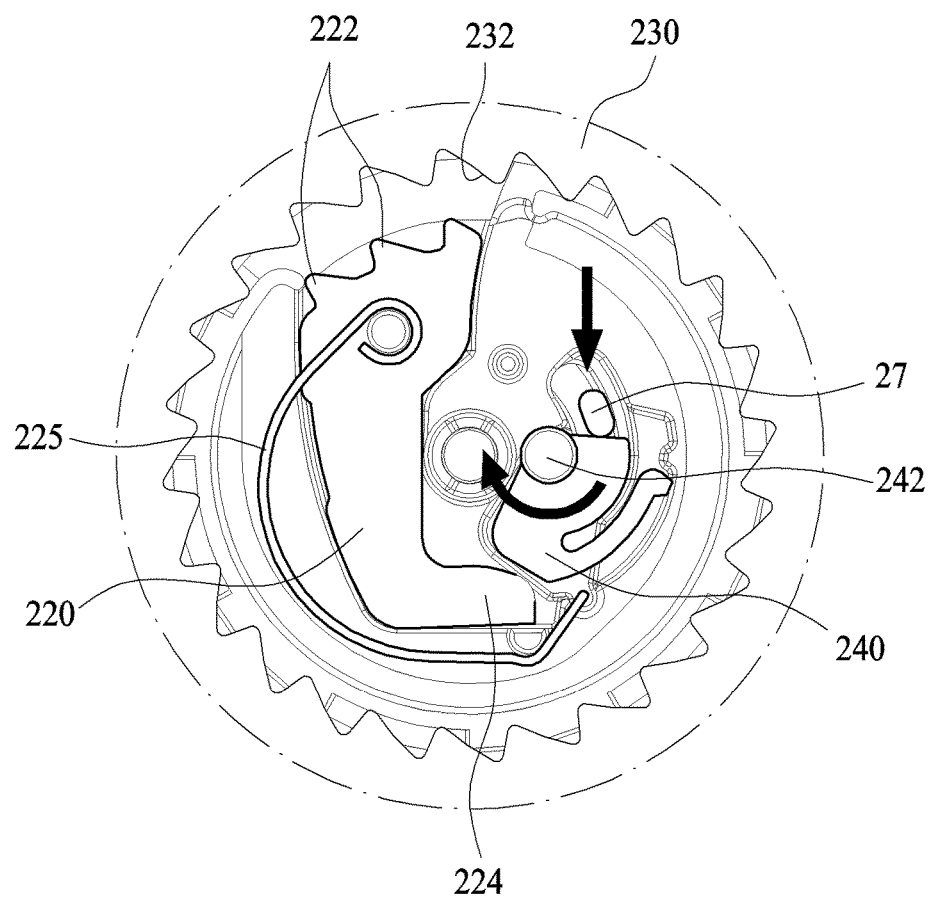
FIG. 11 is a side view illustrating a state in which a rotating member is caught by a catching protrusion of a pawl member as the cam protrusion moves in the holding unit applied to the retractor for a seat belt according to the first exemplary embodiment of the present invention.

Therefore, as the torsion bar 25 is rotated when the pretensioner operates, a series of operating processes are carried out as illustrated in FIG. 11, such that the cam protrusion 27 pushes the rotating member 240 while moving, and the rotating member 240 rotates about the rotating shaft 242 and restricts the catching protrusion 224 of the pawl member 220.

In this case, in the present exemplary embodiment, the holding unit is configured such that a distance between the rotation axis of the torsion bar 25 and the rotating shaft 242 of the rotating member 240 is shorter than a distance between the rotation axis of the torsion bar 25 and the cam protrusion 27.

Therefore, the movement of the pawl member 220 is restricted by the rotating member 240, and the overshoot mitigating module may be rotated along with the rotation of the spool.

Figure 12:
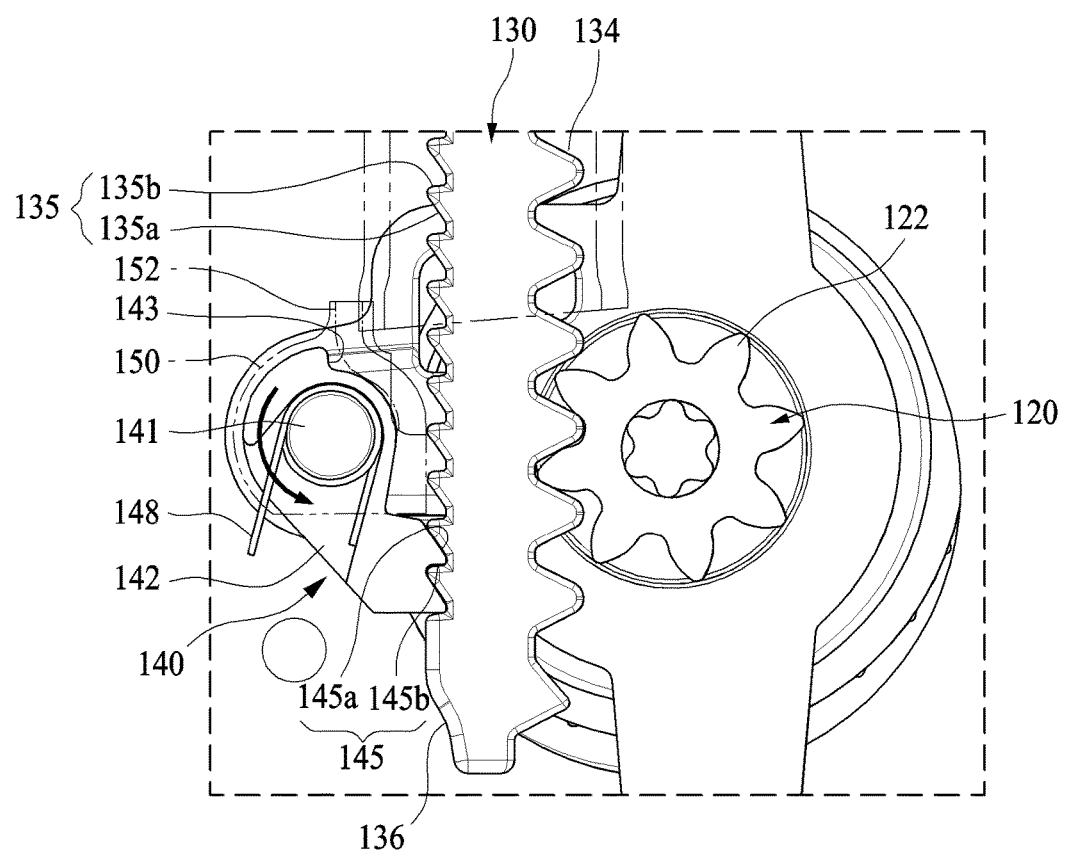
FIG. 12 is a side view illustrating a state in which when the ratchet gear moves in a restoration direction, fixing gear teeth of a fixing member mesh with second gear teeth of the ratchet gear so as to prevent the restoration of the ratchet gear in the retractor for a seat belt according to the first exemplary embodiment of the present invention.
Figure 13:
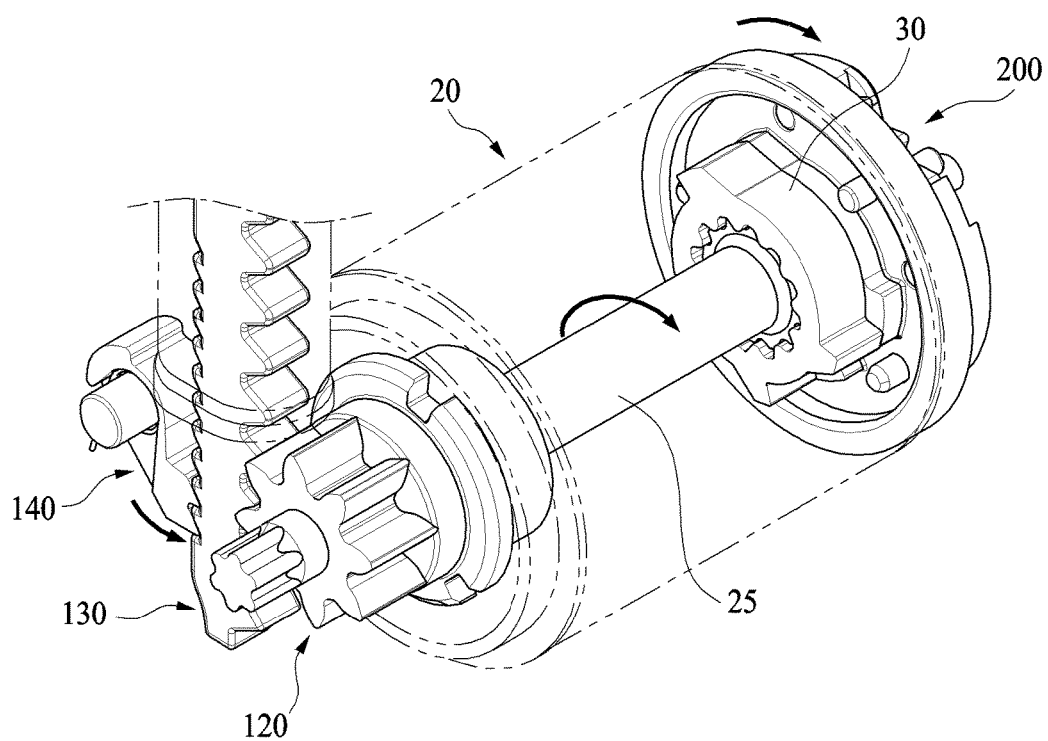
FIG. 13 is a perspective view illustrating a state in which the torsion bar is twisted by fixing the ratchet gear in the retractor for a seat belt according to the first exemplary embodiment of the present invention.

Therefore, in a state in which the fixing unit 140 prevents the restoration of the ratchet gear 130 so as to fix the pinion gear 120 and one side of the torsion bar 25 as illustrated in FIG. 12, the overshoot mitigating module 200 is rotated and the other side of the torsion bar 25 is twisted by force that occurs when the webbing is retracted, as illustrated in FIG. 13.

Therefore, in the present invention, the overshoot mitigating module 200 is slightly rotated even in a state in which one side of the torsion bar 25 is fixed by the fixing unit 140, and the load being applied to the driver's body is distributed, thereby minimizing the overshoot phenomenon.

As described above, in the present invention, the holding unit for the pawl member 220 is provided at a side of the overshoot mitigating module 200, thereby minimizing the locking deep phenomenon and the overshoot phenomenon.

Meanwhile, in the present exemplary embodiment, the holding unit further includes a restoring member 225 having elasticity in order to restore the pawl member 220 that protrudes to mesh with the inner gear 230. The restoring member 225 is a constituent element having elasticity in order to restore the pawl member in a direction opposite to the direction in which the pawl member 220 protrudes.

That is, the restoring member 225 applies external force to the pawl member 220, and when external force equal to or higher than elastic force of the restoring member 225 is applied, the pawl member 220 protrudes outward to prevent the rotation of the spool. Thereafter, the pawl member 220 may be restored to the original position by the restoring member 225.

Specifically, in the present exemplary embodiment, the restoring member 225 is formed in an entirely curved shape, one side of the restoring member 225 is fixed to the spool, and the other side of the restoring member 225 is fixed to the pawl member 220.

In addition, because the situation in which the rotation of the spool is restricted by the pawl member 220 in a state in which the holding unit does not operate as described above, such as the emergency locking retractor (ERL) function, is obvious to those skilled in the art, a description thereof will be omitted.

Hereinafter, other exemplary embodiments of the present invention will be described.

Figure 14:
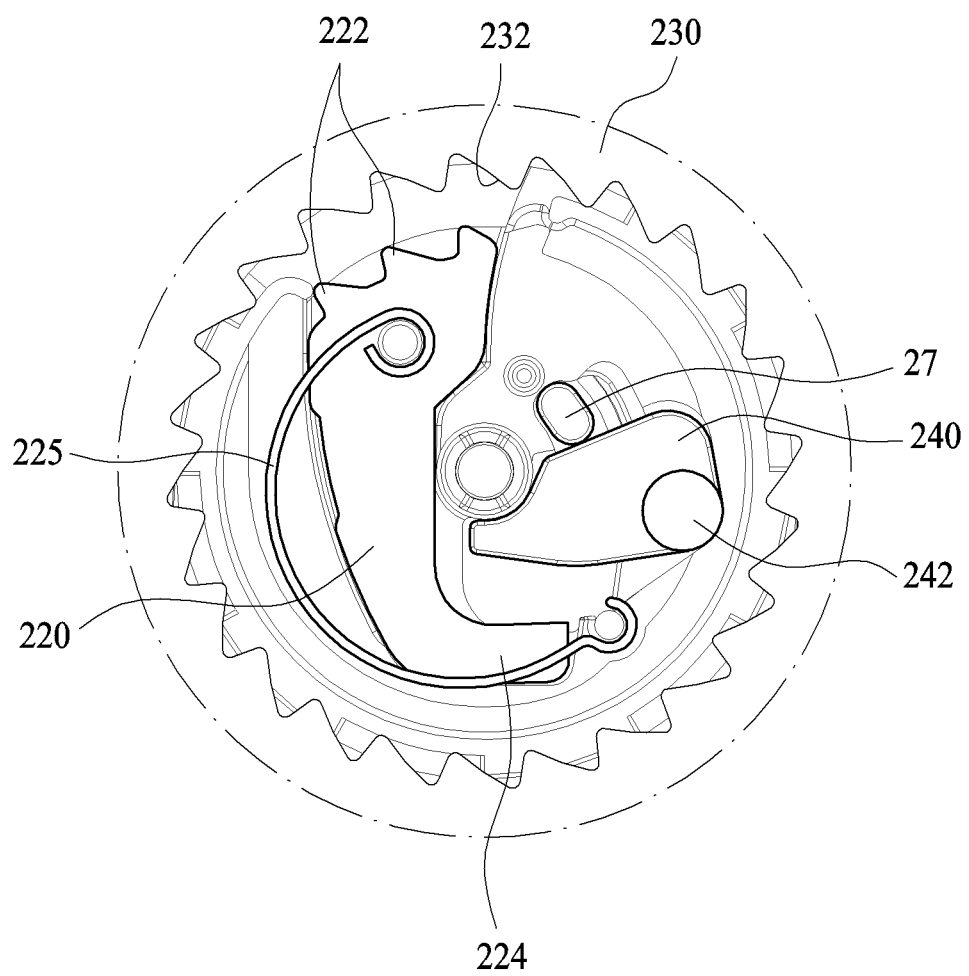
FIG. 14 is a side view illustrating an appearance of a holding unit applied to a retractor for a seat belt according to a second exemplary embodiment of the present invention.
Figure 15:
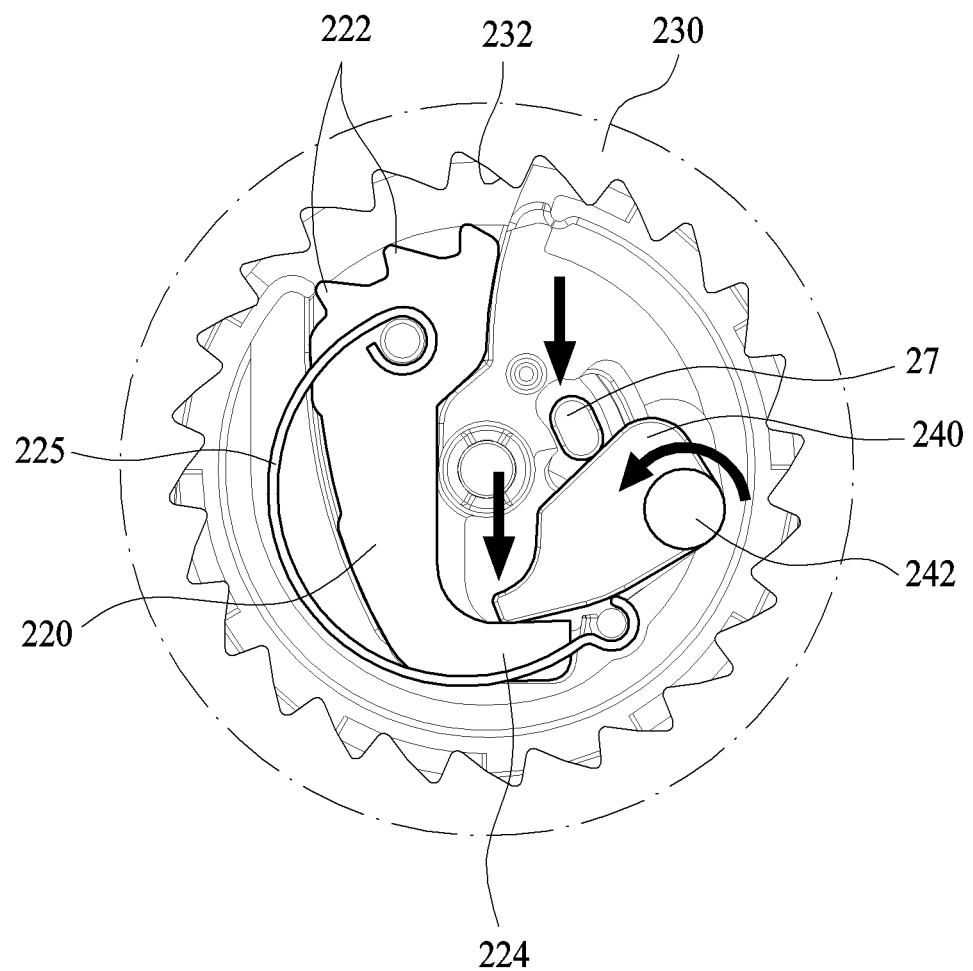
FIG. 15 is a side view illustrating a state in which a rotating member is caught by a catching protrusion of a pawl member as a cam protrusion moves in the holding unit applied to the retractor for a seat belt according to the second exemplary embodiment of the present invention.

FIG. 14 is a side view illustrating an appearance of a holding unit applied to a retractor for a seat belt according to a second exemplary embodiment of the present invention, and FIG. 15 is a side view illustrating a state in which a rotating member 240 is caught by a catching protrusion 224 of a pawl member 220 as a cam protrusion 27 moves in the retractor for a seat belt according to the second exemplary embodiment of the present invention.

In the second exemplary embodiment of the present invention illustrated in FIGS. 14 and 15, like the first exemplary embodiment, the holding unit includes the rotating member 240 and the cam protrusion 27, and the rotating member 240 and the cam protrusion 27 have the same functions as the rotating member 240 and the cam protrusion 27 in the first exemplary embodiment.

However, the present exemplary embodiment differs from the first exemplary embodiment in that a distance between the rotation axis of the torsion bar 25 and the rotating shaft 242 of the rotating member 240 is longer than a distance between the rotation axis of the torsion bar 25 and the cam protrusion 27.

Therefore, in comparison with the first exemplary embodiment, the rotating member 240 rotates in a reverse direction in the present exemplary embodiment, but even in this case, the essential function of the holding unit may be achieved.

Figure 16:
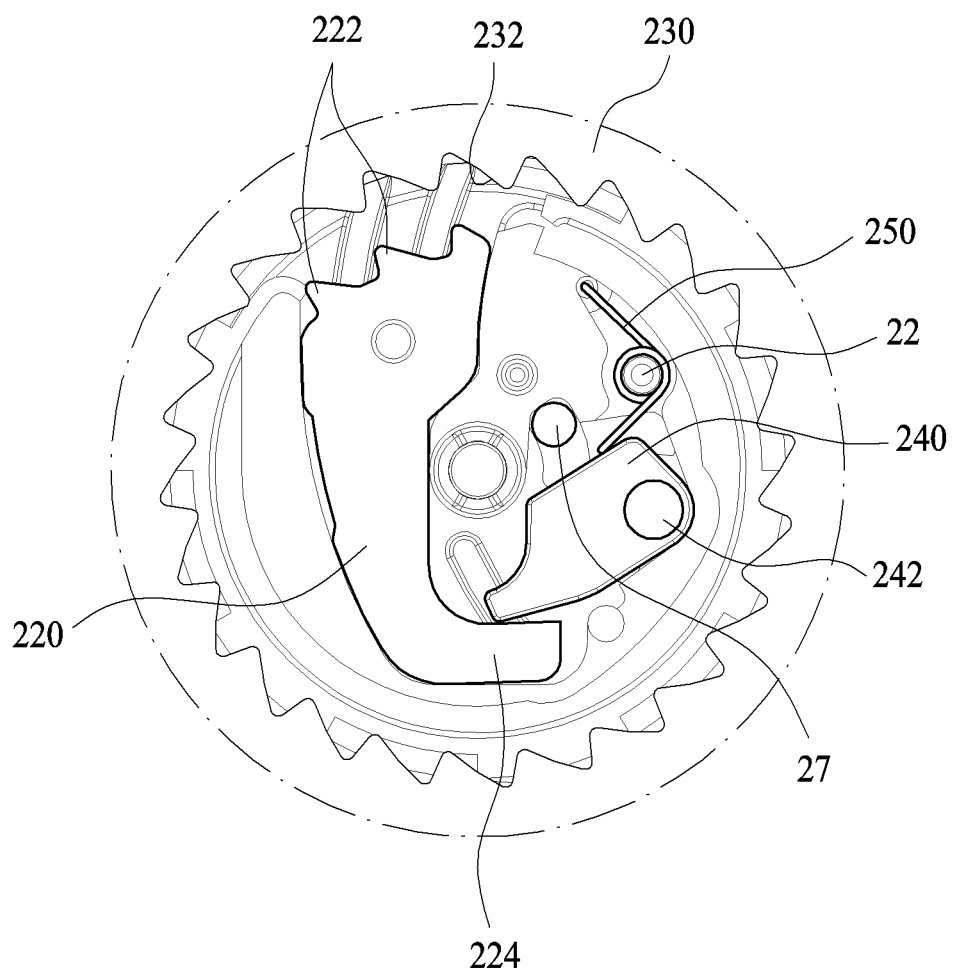
FIG. 16 is a side view illustrating an internal structure of an overshoot mitigating module in a holding unit applied to a retractor for a seat belt according to a third exemplary embodiment of the present invention.

FIG. 16 is a side view illustrating an appearance of a holding unit applied to a retractor for a seat belt according to a third exemplary embodiment of the present invention.

All of the constituent elements of the third exemplary embodiment of the present invention illustrated in FIG. 16 are identical to the constituent elements of the second exemplary embodiment. However, the third exemplary embodiment differs from the second exemplary embodiment in terms of the shape and the position of the restoring member 225.

Specifically, in the present exemplary embodiment, the restoring member 225 is formed in the form of a torsion spring, fixed by a fixing protrusion 22 formed on the frame, and formed to provide restoring force to the rotating member 240 instead of the pawl member 220.

That is, the restoring member 225 is connected to the rotating member 240, and provides restoring force in a direction in which the rotating member 240 rotates to restrict the pawl member 220.

Therefore, the rotating member 240 restricts the pawl member 220 by the restoring member 225 so as to inhibit the pawl member 220 from protruding, and the rotating member 240 may restrict the pawl member 220 by drawing the pawl member 220 downward even though the pawl member 220 protrudes.

As described in the respective exemplary embodiments, it can be seen that the holding unit according to the present invention may be formed in various forms.

Meanwhile, the fixing unit and the holding unit according to the present invention are not limited by the present exemplary embodiment. That is, the fixing unit may be implemented in various forms so as to have a mechanism capable of preventing the restoration of the ratchet gear, and the holding unit may also be implemented in various forms so as to have a mechanism capable of preventing the pawl member from protruding.

The restoring member of the holding unit may also be provided in various forms. That is, one side of the restoring member is connected to the pawl member or the rotating member and serves to restore the pawl member, and the other side of the restoring member may be connected to any position of the spool.

While the exemplary embodiments according to the present invention have been described above, it is obvious to those skilled in the art that the present invention may be specified in other particular forms in addition to the aforementioned exemplary embodiments without departing from the spirit or the scope of the present invention. Accordingly, it should be understood that the aforementioned exemplary embodiments are regarded as illustrative and not restrictive, and thus the present invention is not limited to the aforementioned description, and may be modified within the scope and the equivalent range of the appended claims.

What is claimed is:

1. A pawl member holding unit of a retractor for a seat belt, the pawl member holding unit comprising:
   a cam protrusion which is provided at the other side of a torsion bar that is provided inside a spool, shares a rotation axis with the spool, and rotates together with the spool, the cam protrusion moving in accordance with the rotation of the torsion bar by an operation of a pretensioner; and
   a rotating member which rotates about a rotating shaft in accordance with the movement of the cam protrusion, and applies external force in a direction opposite to an outward movement direction of a pawl member, which performs an automatic locking function.

2. The pawl member holding unit of claim 1, wherein the rotating member rotates in a direction in which the rotating member draws the pawl member downward in order to forcibly restore the pawl member after outward movement of the pawl member.

3. The pawl member holding unit of claim 1, wherein the cam protrusion is provided at a position eccentric from the rotation axis of the torsion bar.

4. The pawl member holding unit of claim 3, wherein a distance between the rotation axis of the torsion bar and the rotating shaft of the rotating member is shorter than a distance between the rotation axis of the torsion bar and the cam protrusion.

5. The pawl member holding unit of claim 3, wherein a distance between the rotation axis of the torsion bar and the rotating shaft of the rotating member is longer than a distance between the rotation axis of the torsion bar and the cam protrusion.

6. The pawl member holding unit of claim 1, further comprising:
   a restoring member which has elasticity to restore the pawl member in a direction opposite to the outward movement direction of the pawl member.

7. The pawl member holding unit of claim 6, wherein the restoring member is connected to the rotating member, and provides restoring force in a direction in which the rotating member rotates to restrict the pawl member.

8. A retractor for a seat belt, the retractor comprising:
   a frame;
   a spool in the frame;
   a torsion bar;
   a pretensioner at one side of the spool; and
   an overshoot mitigating module at the other side of the spool, the overshoot mitigating module including:
      a locking assembly including a pawl member; and
      a pawl member holding unit, the pawl member holding unit including:
         a cam protrusion at the other side of the torsion bar that is inside the spool, shares a rotation axis with the spool, and rotates together with the spool, the cam protrusion moving in accordance with the rotation of the torsion bar by an operation of the pretensioner; and
         a rotating member which rotates about a rotating shaft in accordance with the movement of the cam protrusion, and applies external force in a direction opposite to an outward movement direction of the pawl member, which performs an automatic locking function.

9. A retractor for a seat belt, the retractor comprising:
   a frame which has an inner gear formed therein;
   a spool which is rotatably provided in the frame so as to wind or unwind a webbing;
   a torsion bar which is provided inside the spool, shares a rotation axis with the spool, and rotates together with the spool;
   a pretensioner which is provided at one side of the spool, rotates the torsion bar and the spool in a direction in which the webbing is retracted when impact occurs from the outside, and fixes one side of the torsion bar; and
   an overshoot mitigating module which is provided at the other side of the spool, rotates along with the rotation of the spool after the pretensioner fixes one side of the torsion bar, and rotates the other side of the torsion bar,
   wherein the overshoot mitigating module includes:
   a locking assembly which includes a pawl member that is formed to selectively protrude outward, has gear teeth meshing with gear teeth of the inner gear, and has a catching protrusion; and
   a holding unit which includes a rotating member that is formed to be rotatable by a rotating shaft, and a cam protrusion that is provided at the other side of the torsion bar and allows the rotating member to be caught by the catching protrusion by rotating the rotating member along with the rotation of the torsion bar by the operation of the pretensioner.

* * * * *